(12) United States Patent
Elliott et al.

(10) Patent No.: US 9,381,427 B2
(45) Date of Patent: Jul. 5, 2016

(54) GENERIC COMPANION-MESSAGING BETWEEN MEDIA PLATFORMS

(71) Applicant: MICROSOFT CORPORATION, Redmond, WA (US)

(72) Inventors: John Darren Elliott, Lake Forest Park, WA (US); Wyatt Douglas Jackson, Bothell, WA (US); Hansen Liou, Bellevue, WA (US); Alain P. Maillot, Redmond, WA (US); Zhangwei Xu, Redmond, WA (US); Neil Warren Black, Seattle, WA (US); Baber M. Shaikh, Redmond, WA (US); Anthony Vincent Discolo, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 634 days.

(21) Appl. No.: 13/744,100

(22) Filed: Jan. 17, 2013

(65) Prior Publication Data

US 2014/0201378 A1    Jul. 17, 2014

(51) Int. Cl.
*G06F 13/00* (2006.01)
*A63F 13/20* (2014.01)
(Continued)

(52) U.S. Cl.
CPC .............. *A63F 13/06* (2013.01); *A63F 13/12* (2013.01); *A63F 2300/1075* (2013.01); *A63F 2300/301* (2013.01); *A63F 2300/532* (2013.01); *G06F 17/30017* (2013.01); *H04L 67/38* (2013.01)

(58) Field of Classification Search
CPC .... H04N 21/8133; H04L 29/08; H04L 29/06; H04L 29/08576; H04L 29/08072; H04L 29/0809; H04L 29/06095; H04L 67/38; A63F 13/06; A63F 13/12; A63F 2300/1075; A63F 2300/301; A63F 2300/532; A63F 17/30017
USPC ........................................................ 709/227
See application file for complete search history.

(56) References Cited

U.S. PATENT DOCUMENTS 5,117,484 A   5/1992   Nakagawa et al.
5,467,467 A   11/1995  Ozawa
(Continued)

FOREIGN PATENT DOCUMENTS

WO       2010028690 A1    3/2010

OTHER PUBLICATIONS

Non-Final Office Action dated Oct. 8, 2014 in U.S. Appl. No. 13/723,365, 18 pages.
(Continued)

*Primary Examiner* — Robert B Harrell
(74) *Attorney, Agent, or Firm* — Aaron Chatterjee; Judy Yee; Micky Minhas

(57) ABSTRACT

Various embodiments, methods, and systems for communicating via a generic companion-messaging session are provided. The generic companion-messaging session includes a base platform running a base platform application and a companion platform running a companion platform application. An initialization message that automatically pairs the companion platform application and the base platform application is sent from the companion platform to the base platform for a generic companion-messaging session. The companion platform is connected to an encrypted communication channel for the generic companion-messaging session with the base platform. The encrypted communication channel supports bidirectional communication over a plurality of connections. A connection from the plurality of connections is determined for routing a message. The message is routed via a direct connection when the direct connection with the base platform is determined and the message is routed via an indirect connection when the indirect connection with the base platform is determined.

20 Claims, 14 Drawing Sheets

(51) Int. Cl.
*A63F 13/30* (2014.01)
*G06F 17/30* (2006.01)
*H04L 29/06* (2006.01)

(56) References Cited

U.S. PATENT DOCUMENTS

| | | | |
|---|---|---|---|
| 6,816,897 B2 | 11/2004 | McGuire | |
| 7,500,154 B2 | 3/2009 | Moon et al. | |
| 7,512,677 B2 | 3/2009 | Cox et al. | |
| 7,870,496 B1* | 1/2011 | Sherwani | 715/761 |
| 8,014,768 B2 | 9/2011 | Ackley | |
| 8,200,795 B2 | 6/2012 | Patil | |
| 8,521,888 B2* | 8/2013 | Larson et al. | 709/227 |
| 8,595,781 B2* | 11/2013 | Neumeier et al. | 725/105 |
| 8,856,355 B2* | 10/2014 | Queen | 709/227 |
| 9,002,018 B2* | 4/2015 | Wilkins et al. | 380/285 |
| 9,032,451 B2* | 5/2015 | Cansino et al. | 725/74 |
| 2002/0059342 A1 | 5/2002 | Gupta et al. | |
| 2003/0025678 A1* | 2/2003 | Lee et al. | 345/173 |
| 2003/0046398 A1 | 3/2003 | Buckley et al. | |
| 2003/0046401 A1 | 3/2003 | Abbott et al. | |
| 2003/0182663 A1 | 9/2003 | Gudorf et al. | |
| 2004/0023719 A1* | 2/2004 | Hussaini et al. | 463/37 |
| 2004/0073947 A1 | 4/2004 | Gupta | |
| 2004/0120526 A1* | 6/2004 | Hamberg | 380/277 |
| 2005/0081159 A1 | 4/2005 | Gupta et al. | |
| 2005/0234958 A1 | 10/2005 | Sipusic et al. | |
| 2007/0266304 A1 | 11/2007 | Fletcher et al. | |
| 2007/0300185 A1 | 12/2007 | Macbeth et al. | |
| 2008/0248845 A1 | 10/2008 | Morgan et al. | |
| 2008/0313227 A1 | 12/2008 | Shafton et al. | |
| 2009/0055739 A1 | 2/2009 | Murillo et al. | |
| 2009/0083383 A1 | 3/2009 | Piper et al. | |
| 2009/0154893 A1 | 6/2009 | Vasudevan et al. | |
| 2009/0199098 A1 | 8/2009 | Kweon et al. | |
| 2009/0221368 A1 | 9/2009 | Yen et al. | |
| 2009/0235298 A1 | 9/2009 | Carlberg et al. | |
| 2009/0265627 A1 | 10/2009 | Kim et al. | |
| 2009/0276475 A1* | 11/2009 | Ramsey et al. | 707/204 |
| 2010/0050129 A1 | 2/2010 | Li et al. | |
| 2010/0053164 A1* | 3/2010 | Imai et al. | 345/427 |
| 2010/0069158 A1* | 3/2010 | Kim | 463/42 |
| 2010/0162139 A1 | 6/2010 | Beebe et al. | |
| 2010/0199232 A1 | 8/2010 | Mistry et al. | |
| 2010/0235481 A1* | 9/2010 | Deutsch et al. | 709/222 |
| 2010/0251167 A1 | 9/2010 | DeLuca et al. | |
| 2010/0277489 A1 | 11/2010 | Geisner et al. | |
| 2010/0318520 A1 | 12/2010 | Loeb et al. | |
| 2011/0034129 A1 | 2/2011 | Kim et al. | |
| 2011/0078001 A1 | 3/2011 | Archer et al. | |
| 2011/0106587 A1 | 5/2011 | Lynch et al. | |
| 2011/0111854 A1 | 5/2011 | Roberts et al. | |
| 2011/0134030 A1* | 6/2011 | Cho | 345/157 |
| 2011/0158605 A1 | 6/2011 | Bliss et al. | |
| 2011/0173214 A1 | 7/2011 | Karim | |
| 2011/0190055 A1 | 8/2011 | Leyvand et al. | |
| 2011/0190061 A1 | 8/2011 | Takeda et al. | |
| 2011/0202350 A1 | 8/2011 | Barnes | |
| 2011/0258545 A1 | 10/2011 | Hunter | |
| 2011/0273625 A1* | 11/2011 | McMahon et al. | 348/734 |
| 2011/0300930 A1 | 12/2011 | Hsu | |
| 2011/0302527 A1 | 12/2011 | Chen et al. | |
| 2012/0014558 A1* | 1/2012 | Stafford et al. | 382/103 |
| 2012/0017147 A1 | 1/2012 | Mark | |
| 2012/0026166 A1* | 2/2012 | Takeda et al. | 345/419 |
| 2012/0047289 A1* | 2/2012 | Krzystofczyk et al. | 710/10 |
| 2012/0072504 A1* | 3/2012 | Kowalewski | 709/206 |
| 2012/0151345 A1 | 6/2012 | McClements, IV | |
| 2012/0151347 A1 | 6/2012 | McClements, IV | |
| 2012/0162536 A1* | 6/2012 | Sibilsky et al. | 348/734 |
| 2012/0174155 A1* | 7/2012 | Mowrey et al. | 725/40 |
| 2012/0207342 A1* | 8/2012 | Quail | 382/100 |
| 2012/0231861 A1 | 9/2012 | Champagne et al. | |
| 2012/0302340 A1 | 11/2012 | Takemoto | |
| 2012/0331496 A1 | 12/2012 | Copertino et al. | |
| 2013/0004138 A1 | 1/2013 | Kilar et al. | |
| 2013/0007201 A1 | 1/2013 | Jeffrey et al. | |
| 2013/0111326 A1 | 5/2013 | Lockhart et al. | |
| 2013/0198321 A1* | 8/2013 | Martin et al. | 709/217 |
| 2013/0214994 A1* | 8/2013 | Tsuda et al. | 345/1.1 |
| 2013/0262575 A1 | 10/2013 | Xiong et al. | |
| 2013/0321268 A1* | 12/2013 | Tuck et al. | 345/157 |
| 2014/0020025 A1* | 1/2014 | Anderson et al. | 725/43 |
| 2014/0195690 A1* | 7/2014 | Harrison et al. | 709/228 |

OTHER PUBLICATIONS

Non-Final Office Action dated Oct. 23, 2014 in U.S. Appl. No. 13/725,925, 21 pages.
Non-Final Office Action dated Dec. 26, 2014 in U.S. Appl. No. 13/795,622, 14 pages.
Final Office Action dated Jun. 23, 2014 in U.S. Appl. No. 13/795,622, 11 pages.
International Search Report with Written Opinion mailed Jun. 25, 2014 in Application No. PCT/US2014/011373, 10 pages.
Transport Layer Security, Published on: Jan. 16, 2013, Available at:http://en.wikipedia.org/w/index.php?title=Transport%20_Layer%20_Security&oldid=533283246.
Canvas element, Published on: Jan. 16, 2013, Available at:http://en.wikipedia.org/w/index.php?title=Canvas%20element&oldid=533346213.
IP forwarding algorithm, Published on: Nov. 12, 2012, Available at:http://en.wikipedia.org/w/index.php?title=IP_forwarding_algorithm&oldid=522576662.
Non-Final Office Action dated Jan. 2, 2014 re U.S. Appl. No. 13/795,622, 18 pages.
PCT Application No. PCT/US2013/042547, International Search Report, dated Dec. 13, 2013, 11 pages.
Malfatti et al., Using Mobile Phones to Control Desktop Multiplayer Games, In Proceeding of 9th Brazilian Symposium on Computer Games and Digital Entertainment, Nov. 8, 2010, 7 pages.
Vajk, et al., Using a Mobile Phone as a Wii-like Controller for Playing Games on a Large Public Display, Retrieved on Oct. 12, 2012, available at http://downloads.hindawi.com/journals/ijcgt/2008/539078.pdf.
Thurana, Jeffry, How to Easily Activate Two Finger Scroll in Windows Laptops, published on Mar. 23, 2010, available at http://www.makeuseof.com/tag/easily-activate-finger-scroll-windwos-laptops/.
Rahimi, David, How to Enable and Use TouchWiz 4.0 Motion Controls, published on May 2, 2012, available at http://www.phonebuff.com/2012/05/enable-touchwiz-4-0-motion-controls.
Buchanan, Matt, Video: Samsung Instinct Lets You Browse Web Pages with Tilt Navigation (plus, It's Under $300), published on Apr. 2, 2008, available to http://gizmodo.com/374937/video-samsung-instict-lets-you-browse-web-pages-with-tilt-navigation-plus-its-under-300.
The Battle for Control of Your Living Room TV Has Not Been Won, published on Feb. 2, 2012, available at http://wired.co.uk//news/archive/2012-02/02/the-battle-for-dominance-in-web-tv?page+all.
Ursu et al Enhancing Social Communication and Belonging by Integrating TV Narrativity and Game-Play in Proceedings of Europeon Interacitve TV Conference, Jun. 3, 2009, 3 pages.
Apple Shows Off Time-Shifted GameCenter Multiplayer with Real Racing 3, published on Sep. 12, 2012, available to http://techcrunch.com/2012/09-12apple-shows-off-time-shifted-gamecenter-multiplayer-with-real-racing-3/.
Non-Final Office Action dated Jan. 7, 2015 in U.S. Appl. No. 13/724,360, 23 pages.
Final Office Action dated Mar. 12, 2015 in U.S. Appl. No. 13/723,365, 22 pages.
Notice of Allowance dated Jul. 1, 2015 in U.S. Appl. No. 13/725,925, 13 pages.
Final Office Action dated Jul. 13, 2015 in U.S. Appl. No. 13/724,630, 20 pages.
Final Office Action dated Sep. 25, 2015 in U.S. Appl. No. 13/795,622, 13 pages.
Non-Final Office Action dated Sep. 25, 2015 in U.S. Appl. No. 13/723,365, 21 pages.
Non-Final Office Action dated Apr. 4, 2016 in U.S. Appl. 13/724,630, 18 pages.

* cited by examiner

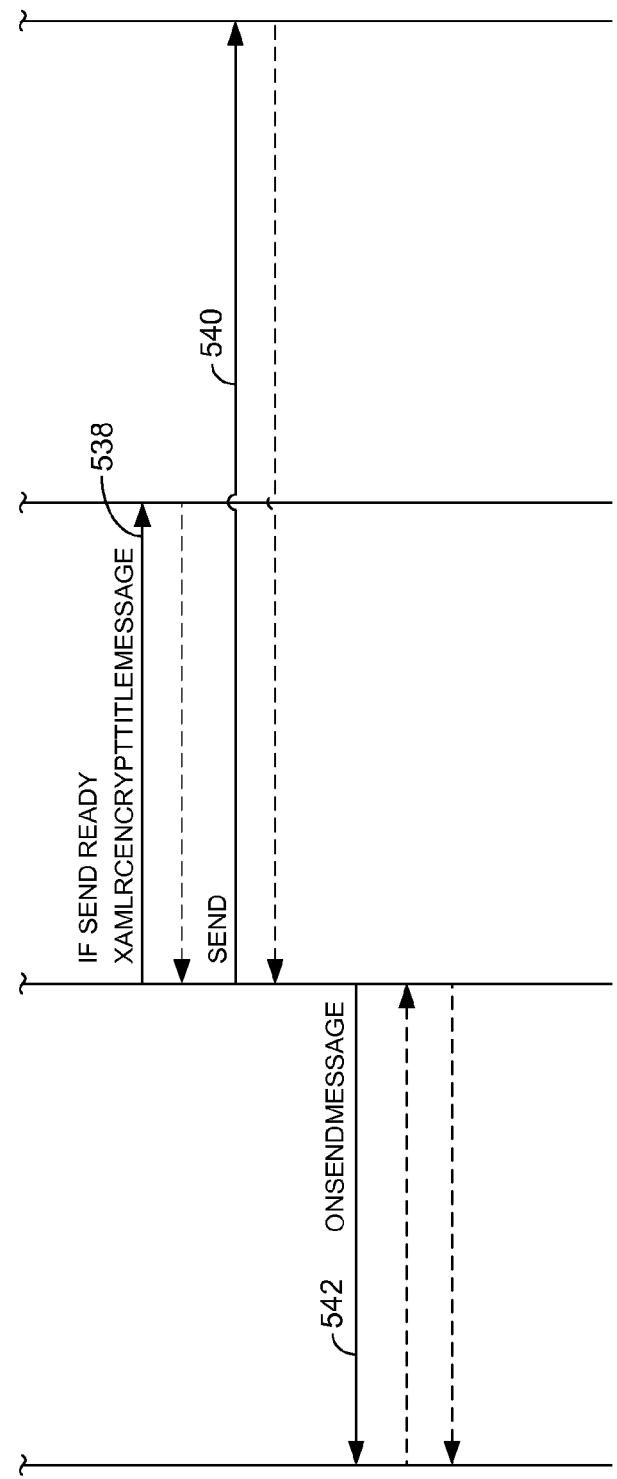

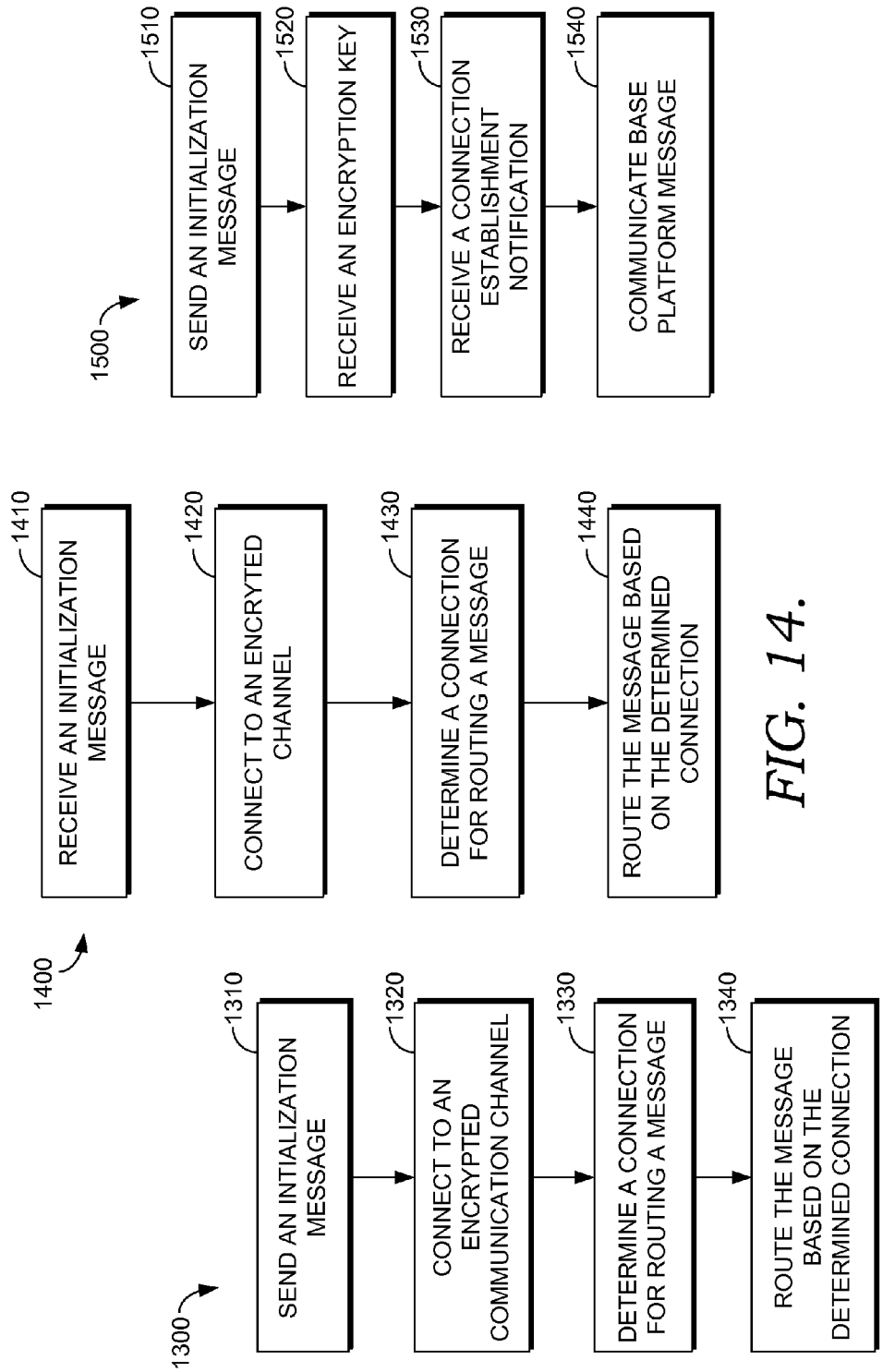

GENERIC COMPANION-MESSAGING BETWEEN MEDIA PLATFORMS

CROSS-REFERENCE TO RELATED APPLICATIONS

This application claims the benefit of priority to U.S. Provisional Application No. 61/654,638, filed Jun. 1, 2012, and entitled COMPANTION EXPERIENCES.

BACKGROUND

Users utilize various types of communication devices that run different types of operating systems and applications. Software developers have to account for the differences between these devices and applications when developing software that requires communication between devices or applications. In addition, users are required to assist with configuring communication components of these devices or applications. The development of software and the associated user interfaces for device communication lack a construct that enables seamless device communication.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for communicating via a generic companion-messaging session that includes a base platform running a base platform application and a companion platform running a companion platform application. The method includes sending an initialization message to the base platform for a generic companion-messaging session between the companion platform application and the base platform application. The generic companion-messaging session automatically pairs the companion platform application and the base platform application. Automatically pairing the platform application and the base platform application may be based on an abstraction layer that provides transparency in the communication between the applications. The method further includes connecting to an encrypted communication channel for the generic companion-messaging session with the base platform. The encrypted communication channel supports bidirectional communication over a plurality of connections. The method also includes determining a connection from the plurality of connections for routing a message. The message is routed via a direct connection when the direct connection with the base platform is determined and the message is routed via an indirect connection when the indirect connection with the base platform is determined. The direct connection is a local network connection with the base platform and the indirect connection is an Internet-service connection. The method further includes communicating the message such that the message is routed based on the connection with the base platform.

BRIEF DESCRIPTION OF THE DRAWINGS

Embodiments of the invention are described in detail below with reference to the attached drawing figures, wherein:

FIG. 13 is a flow diagram showing a method for communicating via a generic companion-messaging session in accordance with embodiments of the present invention;

FIG. 14 is a flow diagram showing a method for communicating via a generic companion-messaging session in accordance with embodiments of the present invention; and FIG. 15 is a flow diagram showing a method for communicating via a generic companion-messaging session in accordance with embodiments of the present invention.

DETAILED DESCRIPTION

Figure 1:
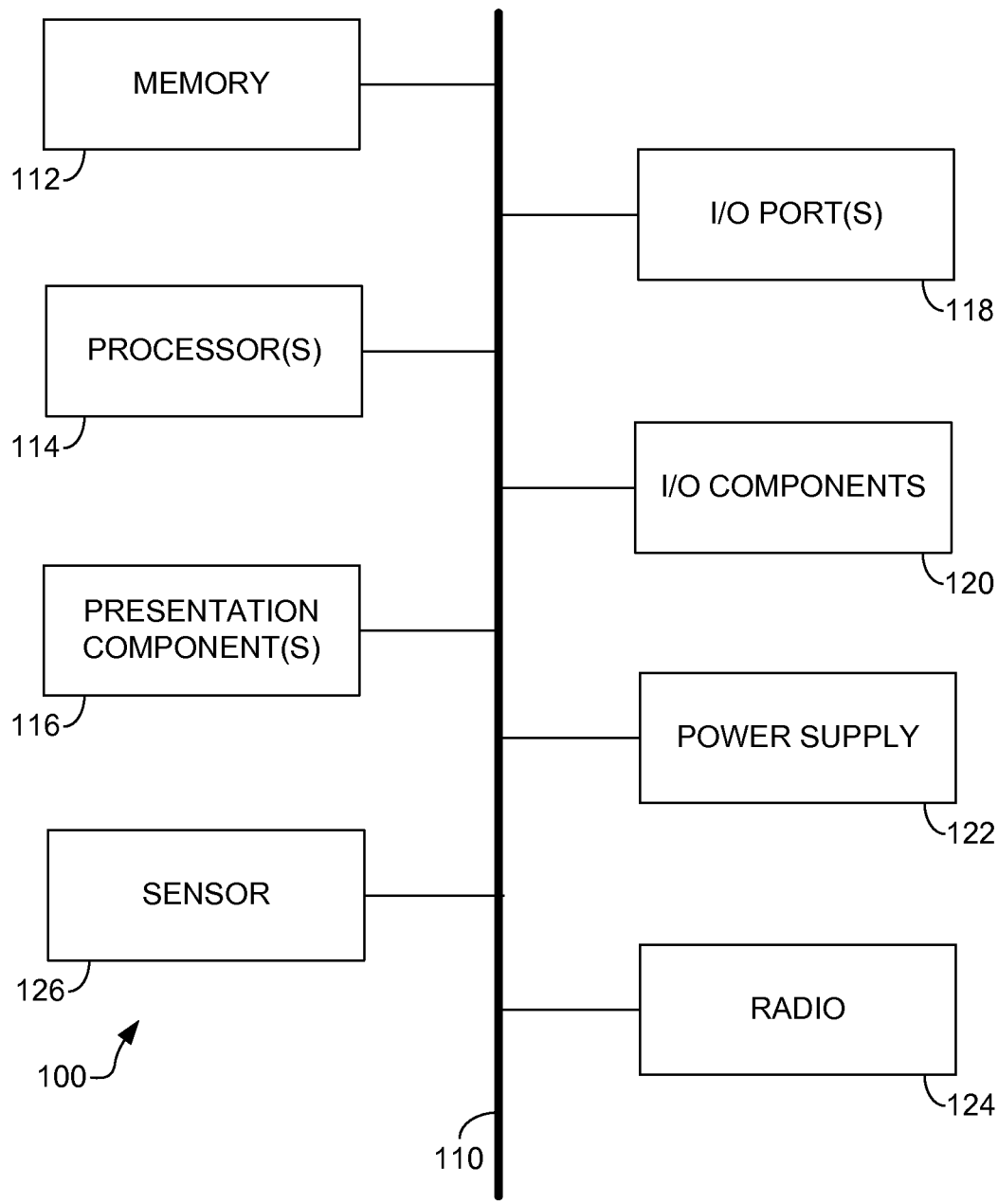
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

ADK XBOX Application Development Kit
API Application Programming Interface
JSON Java Script Object Notation
LRC Living Room Companion
SDK Software Development Kit
SDP Service Discovery Protocol
TCP Transmission Control Protocol
TMF Transmedia Foundation
UDP User Datagram Protocol
XAM XBOX System Services
XamLrc XAM library for LRC
XDK XBOX Development Kit
XLrc XDK title library for LRC Various aspects of the technology described herein are generally directed to systems, methods, and computer storage media for, among other things, communicating via a generic companion-messaging session that includes a base platform running a base platform application (e.g., title) and a companion platform running a companion platform application (e.g., LRC with a hosted application). Embodiments of the invention provide underlying communication functionality to enable companion experiences using messages routed during a generic companion-messaging session. A media platform (e.g., computing device, game console, television, tablet, or other touch-screen device) communicates with another media platform via a determined connection for the generic companion-messaging session. A media platform may support several different types of digital media content. The media platform may also include support applications (e.g., titles or hosted application) for using digital media content. Digital media content ("media content") may generally refer to information delivered to an end-user in specific contexts (e.g., listening to music, watching movies, playing video games). Media content may be broadcast, streamed, or accessed from media storage (e.g., local hard drive or network locations) on the media platform display. The media platform may include several different control features (e.g., remotes or controllers) and interface features (e.g., display interface, gesture interface) that allow users to use the media content.

A media platform may be a companion platform or a base platform. The companion platform and the base platform are media platforms that play specific roles in a generic companion-messaging session. A companion platform, as used in this application, is a personal computing device that provides a second display screen. Examples include laptops, PCs, netbooks, smartphones, e-readers, PDAs, and tablets. In embodiments, the companion platform may be a secondary platform to the primary base platform usually with a first display screen. It is also contemplated with the scope of this invention that the companion platform may also be the base platform running the companion platform application on a second display interface.

A companion experience allows the user to interact with content playing on the primary base platform, or supplemental content related to the media content, through a companion platform. The companion platform runs a companion platform application (e.g., hosted application) that provides controls, additional information, and interaction with a base platform application (e.g., title). The companion platform application communicates with base platform application running on the base-platform (e.g., a game console, PC, TV, or other companion platform) to provide additional interface options on the companion platform. For example, the companion platform may provide supplemental game information, such as play tips downloaded from a tip site, to help the user with the game playing on a game console.

Companion experiences provide for a phone, tablet, or other companion device to be used to navigate a base platform application or used as a second screen companion for a TV or other primary device as the companion platform automatically serves extended experiences and interactive experiences (e.g. behind-the-scenes commentary and real-time game strategy) for different types of media content (e.g., movies and games). In particular, such companion experience may be presented on the companion platform using dynamic scriptable rendering. Dynamic scriptable rendering may be a canvas element (e.g., HTML5 Canvas) that allows scripts to generate graphics in real-time. The Canvas includes drawing regions defined in HTML code (e.g., height and width attributes) and using drawing functions to render graphics. The graphics in this case are displayed on the companion application and associated with content, interfaces, and actions performed on the base platform.

The generic companion-message session automatically pairs the base platform application and the companion platform application such that an abstraction layer of the base platform application and an abstraction layer of the companion platform application may route and encrypt messages. The abstraction layer (e.g., APIs and XDK) hides the implementation details of a generic companion-messaging session to provide generic companion-messaging transparency. Several routines and functions of the abstraction layer make transparency possible in that the applications are able to send messages back and forth without having to change their internal behavior for each external interface (e.g., platform-specific interfaces) device or application with which the applications communicate with. In embodiments, the abstraction layer includes system-side code, companion platform-side APIs, and base platform-side APIs routing messages during a generic companion-messaging session to provide companion experiences. The abstraction layer supports, among other things, an initialization process between the platforms, service discovery protocols, encryption, establishment notification, and user accounts authentication, in automatically and simultaneously pairing a plurality of companion platforms with a base platform.

Further, the communication between the base platform and the companion platform is based on a determined connection for the generic companion-messaging session. A direct or indirect connection may be used to route messages between the companion platform and the base platform. At a high level, a direct connection includes a local network connection (e.g., wired or wireless). If a companion platform cannot connect to a base platform using the direct connection, it may use an indirect connection (e.g. Internet-service connection).

An indirect connection is a wide area network connection (e.g., ISP/3G/4G) that routes messages through the Internet via a service (e.g., TMF service). The connections may support different types of message delivery method (e.g., point-to-point or broadcast message) over different transports (e.g., TCP or UDP). As discussed the messages are routed to support underlying communication functionality to enable companion experiences; a companion experience allows the user to interact with content playing on the primary base platform, or supplemental content related to the media content, through the companion platform.

In a first aspect of the present invention, one or more computer storage media storing computer-useable instructions that, when used by one or more computing devices, cause the one or more computing devices to perform a method for communicating via a generic companion-messaging session. The method includes sending an initialization message to a base platform for a generic companion-messaging session between a companion platform application and a base platform application. The generic companion-messaging session, automatically pairs the companion platform application and the base platform application. The method further includes connecting to an encrypted communication channel for the generic companion-messaging session with the base platform. The encrypted communication channel supports bidirectional communication over a plurality of connections. The method also includes determining a connection from the plurality of connections for routing a message. The message is routed via a direct connection when the direct connection with the base platform is determined and the message is routed via an indirect connection when the indirect connection with the base platform is determined. The direct connection is a local network connection with the base platform and the indirect connection is an Internet-service connection. The method further includes communicating the message such that the message is routed based on the connection with the base platform.

In a second aspect of the present invention, one or more computer storage media storing computer-useable instructions that, when used by one or more computing devices, cause the one or more computing devices to perform a method for communicating via a generic companion-messaging session. The method includes receiving an initialization message from a companion platform for a generic companion-messaging session between a companion platform application and a base platform application. The generic companion-messaging session, automatically pairs the companion platform application and the base platform application based on a generic companion-messaging abstraction layer that facilitates platform-independent communication between the companion platform application and the base platform application. The method includes connecting to an encrypted communication channel for the generic companion-messaging session with the companion platform. The encrypted communication channel supports bidirectional communication over a plurality of connections. The method further includes determining a connection from the plurality of connections for routing a message. The message is routed via a direct connection when the direct connection with the companion platform is determined and the message is routed via the indirect connection when an indirect connection with the companion platform is determined. The direct connection is a local network connection with the base platform and the indirect connection is an Internet-service connection. The method also includes communicating the message such that the message is routed based on the connection with the base platform.

In a third aspect of the present invention, a method for communicating via a generic companion-messaging session is provided. The method includes sending an initializing message for the generic companion-messaging session from a base platform to a companion platform. The generic companion-messaging session, automatically pairs a companion platform application on the companion platform with a base platform application on the base platform based on a generic companion-messaging abstraction layer that facilitates platform-independent communication between the companion platform application and the base platform application. The method includes receiving an encryption key at the base platform for an encrypted communication channel for the generic companion-messaging session with companion platform associated with the encryption key. The encrypted communication channel supports bidirectional communication over a plurality of connections. The method further includes, prior to routing a base platform message, receiving at the base platform from the companion platform a connection establishment notification for the generic companion-messaging session. The method also includes automatically communicating the base platform message such that the base platform message is routed based on the connection with the companion platform.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits and/or receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Figure 2:
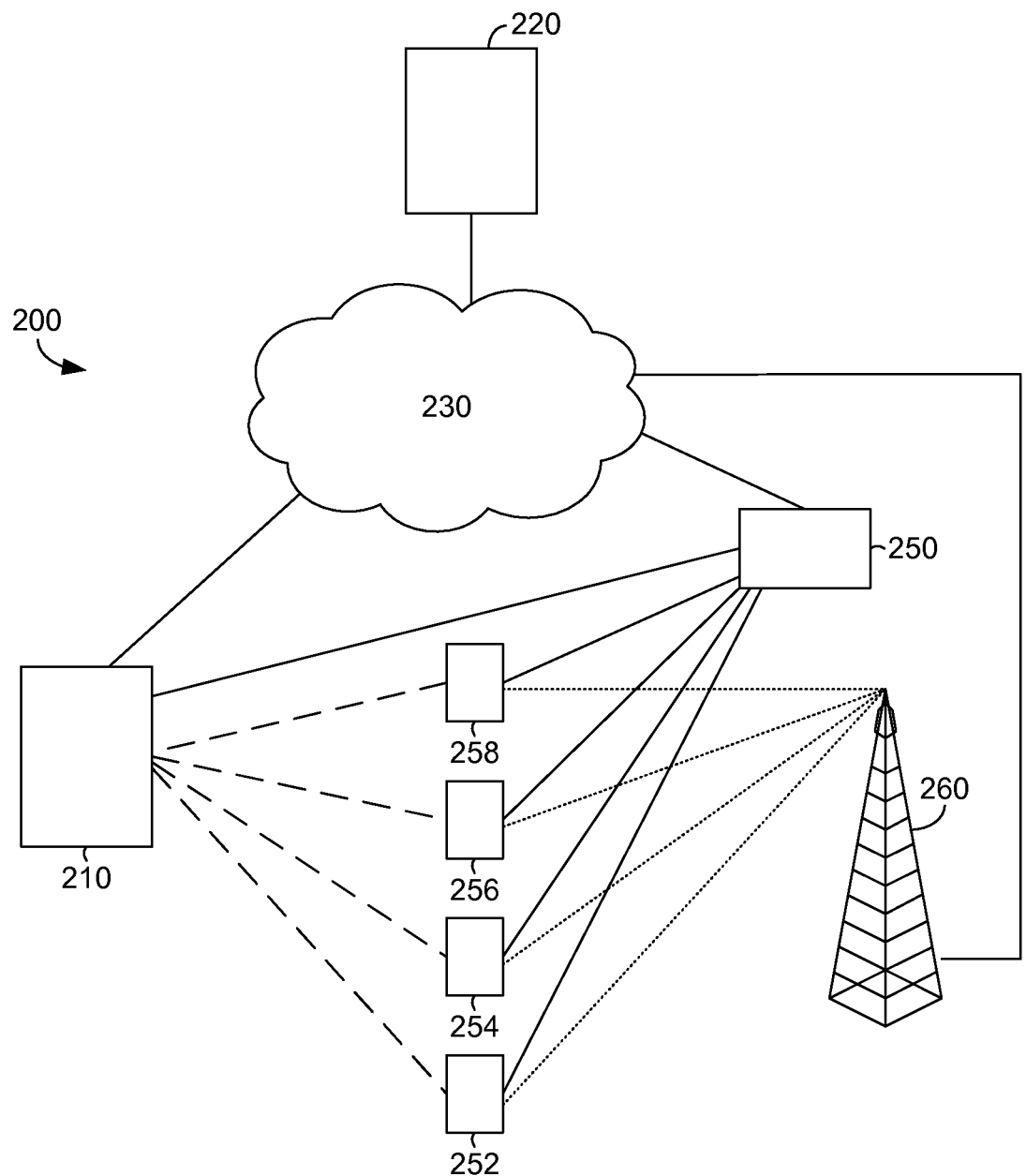
FIG. 2 is a diagram illustrating a variety of communication mediums between game consoles, game services, and companion platforms, in accordance with an embodiment of the present invention.

Turning now to FIG. 2, a networked operating environment 200 comprising multiple computing devices that can provide a companion experience is shown, in accordance with embodiments of the present invention. The networked operating environment 200 shown in FIG. 2 is an example of one suitable networked operating environment 200. The networked operating environment 200 comprises multiple computing devices similar to the computing device 100 described with reference to FIG. 1. The networked operating environment 200 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the network environment.

The environment 200 includes a base platform 210, companion platforms 252, 254, 256, and 258, a wireless router 250, a base station 260, a network 230 and a companion experience server 220. These devices are merely exemplary and are not intended to be limiting. The base platform 210 may be a game console, media console, or other suitable computing device that presents base platform applications (hereinafter "titles"). Titles may be games, movies, applications, music, videos, television shows, and other media content. The game console may be coupled to a display, such as a television. The companion platforms 252, 254, 256, and 258 are computing devices. A companion platform, as used in this application, is a personal computing device that provides a second display. Examples include laptops, PCs, netbooks, smartphones, e-readers, PDAs, and tablets. A companion experience allows the user to interact with content related to media content playing on a base platform 210 through interfaces on the companion platform. The companion experience may also allow the user to control the media presentation through an interface on the companion platform. The companion experience server 220 facilitates companion experiences by providing companion content, companion applications, registering and authenticating companion platforms, facilitating communications between primary devices and companion platforms, and performing other tasks. The companion experience server may be accessed via a wide-area network, such as the Internet.

The companion platforms 252, 254, 256, and 258 may communicate directly with the base platform 210 via a direct connection (e.g., local area network wired/wireless connection or Bluetooth). The direct connection—local network connection—may be generated by the wireless router 250. The companion platforms 252, 254, 256, and 258 may also communicate indirectly with the base platform 210 via an indirect connection (e.g., wide area network connection) routed through the companion experience server 220 (e.g., Internet-service connection). The Internet-service connection i.e., a wide area network connection that connects through a TMF services may be facilitated by base station 260. The base station 260 could route communications to the base platform through whatever communication to the Internet 230 the base platform is using through the companion experience server. Whenever possible messages will be delivered over the local network connection, typically Wi-Fi, but some devices might be wired. In cases, the companion platform may not be able connect over the local network connection. In these cases, the device will use the TMF service over the Internet (e.g., ISP, 3G, 4G) to deliver generic messages (e.g., companion platform message or base platform message). Determining a connection to route a message is based in part on identifying the connection that exists between the base platform 210 and the companion platform. Identifying what connection exists includes using networking tools (e.g., ping, ip configuration, ip addresses) within the platforms to identify a local or a wide area network connection. In embodiments, Titles and hosted applications can determine from per-client data whether their connection is a local or wide area network connection.

As illustrated in FIG. 2, companion experiences require the base platform and companion platform to communicate with each other. Though described as the platforms communicating, in reality it may include, various applications running on the devices, in conjunction with operating systems, communicating with each other. Embodiments of the present invention provide a generic companion-messaging mechanism that allows applications that have different operating systems, hardware, and for using different software languages to communicate with each other. Generic companion-messaging will be described in more detail with reference to FIGS. 3-9. For the sake of illustration, generic companion-messaging will be described in the context of a console (as a base platform) and a device (as a companion platform), but embodiments are not limited to a console. The base platform could be a game console, PC, Smart TV, cable box, DVR, or other device that outputs content. The companion platform may be a smart phone, tablet, or other platform.

Figure 3:
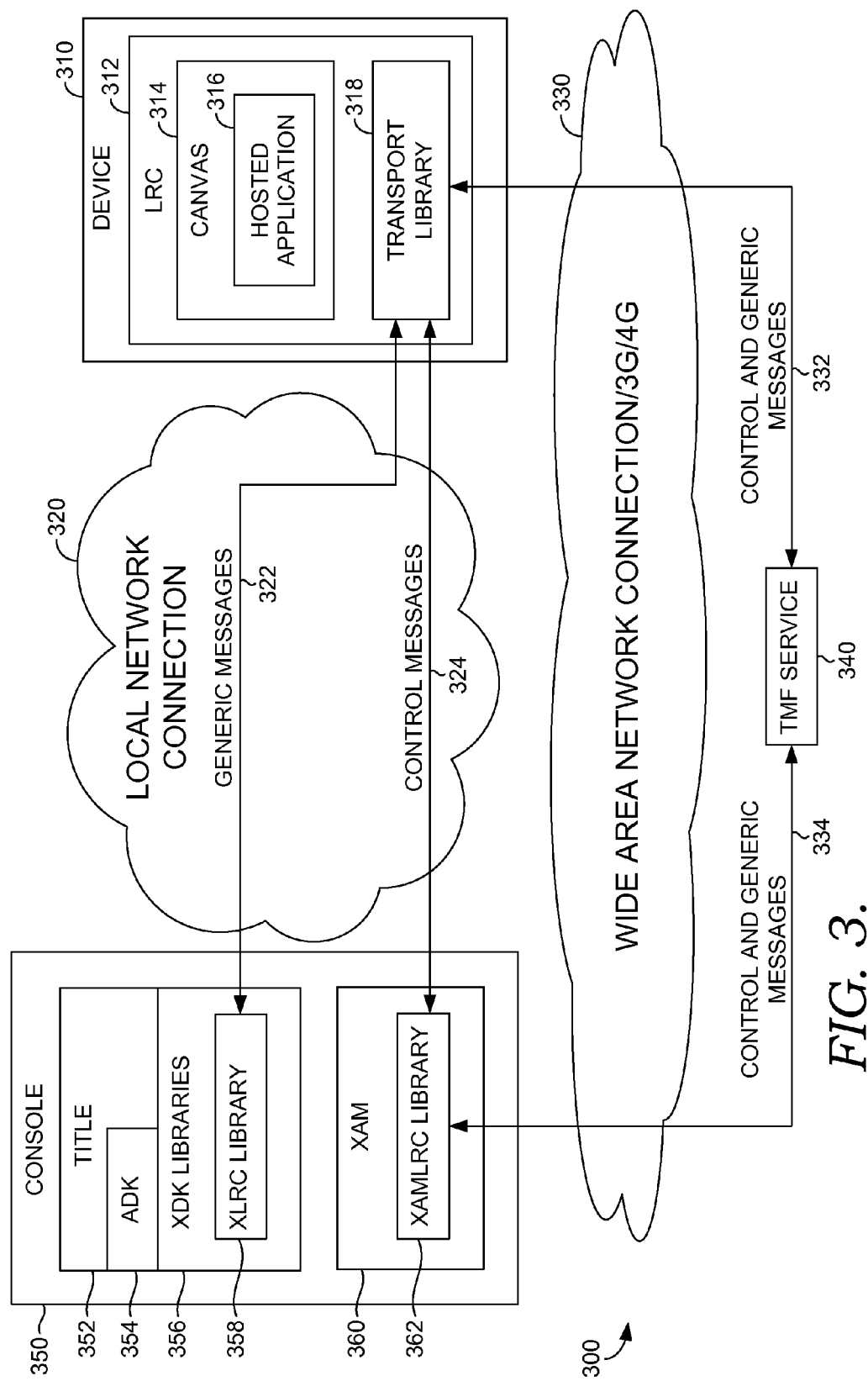
FIG. 3 is a diagram of a computing system architecture for generic companion-messaging between a game console and a companion platform, in accordance with an embodiment of the present invention.

Turning now to FIG. 3, an exemplary diagram 300 is illustrated for generic companion-messaging between a device 310 and a console 350, in accordance with an embodiment of the present invention. Although illustrated and described as a device 310 and a console 350 in a XBOX environment, this is only one example of a suitable environment for generic companion-messaging and is not intended to suggest any limitation as to scope of use or functionality of the invention. Neither should the invention be interpreted as having any dependency or requirement relating to any one or combination of components illustrated in the exemplary device 310 or console 350. Accordingly, the device 310 and the console 350 may be any type of device having computing capability in accordance with embodiments of the present invention.

The device 310 includes the LRC 312, the canvas 314, hosted application 316, and transport library 318. The console 350 includes the title 352, ADK 354, XDK libraries 356, XLrc library 358, XAM 360, and XAMLRC library 362. The title 352 may include console-based games and applications—written using either the XDK 356 or ADK 354. The ADK 354 is the console's application development kit. The XDK 356 is the console's development toolkit and includes the XLRC 358, which is the XDK 356 title library that implements the LRC 312 functionality and APIs. The XAM 360 is the system services and includes the XAMLRC 362 library that implements LRC 312 functionality and APIs. The XLrc library 358 refers to a console 350 (e.g. XBOX® provided by Microsoft Corporation of Redmond, Wash.) developer toolkit ("XDK") title library that titles need to link against to enable companion functionality. Canvas 314 is the container for hosting, title specific, hosted applications. The hosted application 316 may be a HTML5 page and its dependent CSS and JavaScript files, hosted on the developer's servers. Lastly, Transport library 318 includes both the existing TMF proxy for sending generic messages 322 and control messages 324 to support generic companion-messaging.

The components of the console 350 and the device 310 provide an encrypted, communication channel between a title running on the console 350 and the LRC hosted application 316. The LRC 314 may also make use of the channel. The channel supports bidirectional, message-based communication with several delivery options: reliable, unreliable, and unreliable multicast/broadcast. Communication using this channel may be routed over the local network connection whenever possible on a per device basis. When the device 310 cannot connect directly to the console 350 over the local network connection, messages are delivered through a cloud-based service TMF service 340 in FIG. 3. Titles and hosted applications can determine from per-client data whether their connection is local, implying low latency. Embodiments support simultaneous connection of multiple companion platforms to the console 350 at any given point in time, regardless if they connected over the local network connection or through the TMF service 340. A hosted application may be a web based application loaded in an embedded browser that adds companion experiences to console based titles.

The generic companion-messaging session, automatically pairs a hosted application 316 on the companion platform with a title 352 on the console 350 based on a generic companion-messaging abstraction layer that facilitates platform-independent communication between the hosted application 316 and the title. Generic companion-messaging requires special codes to the console system services library ("XamLrc"), the title library that implements LRC functionality and APIs ("XLrc"), and the LRC Transport libraries. In one embodiments, the current XamLrc library is expanded to support multiple, connected devices over TCP. In another embodiment, only UDP is used with added reliability. In another embodiment, all code related to generic companion-messaging runs in the console system services ("XAM"), which would enable for easier protocol upgrades as there would be no generic companion-messaging protocol specific code running in title space. In another embodiment, the generic companion-messaging codebase is moved into the base platform-side API (e.g., XLrc library) running in title space. The abstraction layer also particularly supports the HTML Canvas 314; Canvas 314 is the container for hosting, title specific, hosted applications. The companion platform-side API provides abstraction for the generic companion-messaging to support dynamic scriptable rendering on the hosted application. The hosted application 316 may be a HTML5 page and its dependent CSS and JavaScript files, hosted on the developer's servers. The canvas is a companion platform control encapsulating the web browser control, JavaScript bridge, and object model exposed through the bridge to the HTML5 hosted in the control.

As part of the implementation of generic companion-messaging, a generic companion-messaging session (hereinafter "title message session") is implemented. These title message sessions are created on demand when a hosted application successfully connects to a title over the local network connection 320 or TMF service 340 via the wide area network 330. The TMF sends control and generic messages 332 and 334 between the device 310 and the console 350. Generic messages can include other title specific messages (e.g., touch and gesture events) delivered over the title to hosted application channel or TMF service 340. Generic messages may be title specific messages delivered over the title to hosted application channel or a TMF service 340. Simply, a title message session pairs the title and the hosted application together so that the XLrc 358 and XamLrc 362 can properly route and encrypt messages. A title message session may be initiated in association with a SDP ("Service discovery protocol"). An SDP is a network protocol which allows automatic detection of devices and services offered by these devices on a computer network. The SDP allows the console 350 to advertise a connection on the network and the device 310 to discover the network services of the console 350. Upon the configuration of the network configuration the title messaging session may begin initialization, and using the generic companion-messaging session, titles may send messages to a hosted application running on a specific client after they have received a notification indicating that specific client has connected implying a title message session has been established.

Both the device 310 and the console 350 need to be aware of the transport they employ for communication with one another. The device 310 transport library 318 attempts to establish a local network connection and therefore knows if it was successful. The console 350 may be made aware of a connection when the device 310 successfully connects and then sends a title message session initialization message (e.g., XLRC_MESSAGE_CONNECT). It is contemplated within embodiments of the present invention that the console 350 may not be aware of the connection (e.g., local network connection or wide area connection) between the console 350 and the device 310 and automatically communicates messages over one or more connections associated with the console. In this regard, the console communicates a message and upon communication of the message, the message it routed based on an active connection between the console 350 and one or more devices 310 with a connection. Similarly, a hosted application 316 on a device 310 may also communicate a message to a console 350 and subsequent to said communication, a determination is made for an active connection (e.g., local area network, wide area network) between the device 310 and console 350 on how to route the message to the console 350. Overall, communicating messages to all active connections or prior to determining the active connection facilitates additional abstraction (e.g., transparency) and allows the device to switch between available connections in order to receive messages. Regardless, of the transport, the device 310 sends this message to initialize the title message session. Additionally, both the title 352 and the hosted application 316 can determine each devices transport when receiving information about each client.

One embodiment of generic companion-messaging uses reliable, point-to-point message delivery. The underlying transport may be TCP for local network 320 connected devices. However, APIs may support unreliable delivery as well as broadcast addressing. Unreliable delivery may be used over UDP for local network 320 connected devices. Titles and hosted applications are expected to be aware that when messages are routed through TMF service 340 that delivery will be implemented using slower, reliable mechanisms. Lastly, broadcast addressing may be supported from the console 350 to all devices. Over reliable transports, this may involve sending the message to each device 310 individually over TCP or the TMF service 340 depending on connectivity. Broadcast addressing over unreliable transports may be implemented using UDP multicast and the TMF service for those devices that are not connected directly.

The generic message may take different formats. In one embodiment, the message format supports three headers, one trailer, and several payloads. These message formats may include any additional framing that TMF service 340 adds for messages delivered using its service. The three headers may all share a common set of fields. To support generic companion-messaging a MessageKind (LRC_MESSAGE_KIND_GENERIC) is included in the message library. In one embodiment, the only valid data to be passed for a generic message is a Java Script Object Notation ("JSON") string, indicated with a new MessageType (LRC_MESSAGE_JSON).

Sequence numbers for LRC messages may be kept separately for control messages and generic messages. Simply, they originate in two different libraries on the console 350 and similarly different modules on the device 310. Keeping the sequence numbers separate allow the existing body of code dealing with matching a response with a request to continue to work unchanged.

The generic companion-messaging incorporates secure transport of messages so the console 350, devices 310, and TMF service 340 work together to provide a trustworthy system. From a security standpoint, the device 310 is completely un-trusted when communicating with the console 350. Additionally, it may be assumed that there are compromised devices on the local network 320 that are able to intercept all local network traffic. Service credentials (e.g., user account) are used to authenticate the user. Based on these credentials, a device 310 is allowed to rendezvous with a console 350 when the user on the companion platform is already signed into the console 350.

Given these constraints, traffic to and from the TMF service 340 is over HTTPS. The TMF service 340 may generate all encryption and signing keys. In one embodiment, the TMF service 340 generates a 128-bit HMAC_SHA1 key for signing all messages, ensuring no message has been tampered with. Additionally, the TMF service 340 generates a 128-bit AES key for encrypting all broadcast local network messages as well as per-device initialization messages. All clients (console and devices) receive these session-level signing and encryption keys when joining a session. These keys are changed and redistributed whenever a user on the console 350 signs out. To support per-device privacy, whenever a client joins a session, it also receives a 128-bit AES key from the TMF service 340. The console 350 also receives this same key for each device 310 in the session. When a user signs out on the console 350, the keys associated with devices in the session where the same user was signed in are discarded and no longer used. A per-device encryption key allows the same user to sign in on multiple devices.

In an effort to mitigate some of the risk in having untrusted, opaque data consumed by titles or hosted applications the contents of messages are accessible through a set of hardened function calls. The JSON protocol may be used for all generic message data. On the console 350, this may be exposed to the title developer through the XJSON Parser API. In the alternative, a concatenation of binary fields serialized using an API similar to .NET's BinaryReader may be used. The data size may be set to 1K bytes. Titles are written in such a way that if they are compromised on user's console then they can be revoked.

Figure 4:
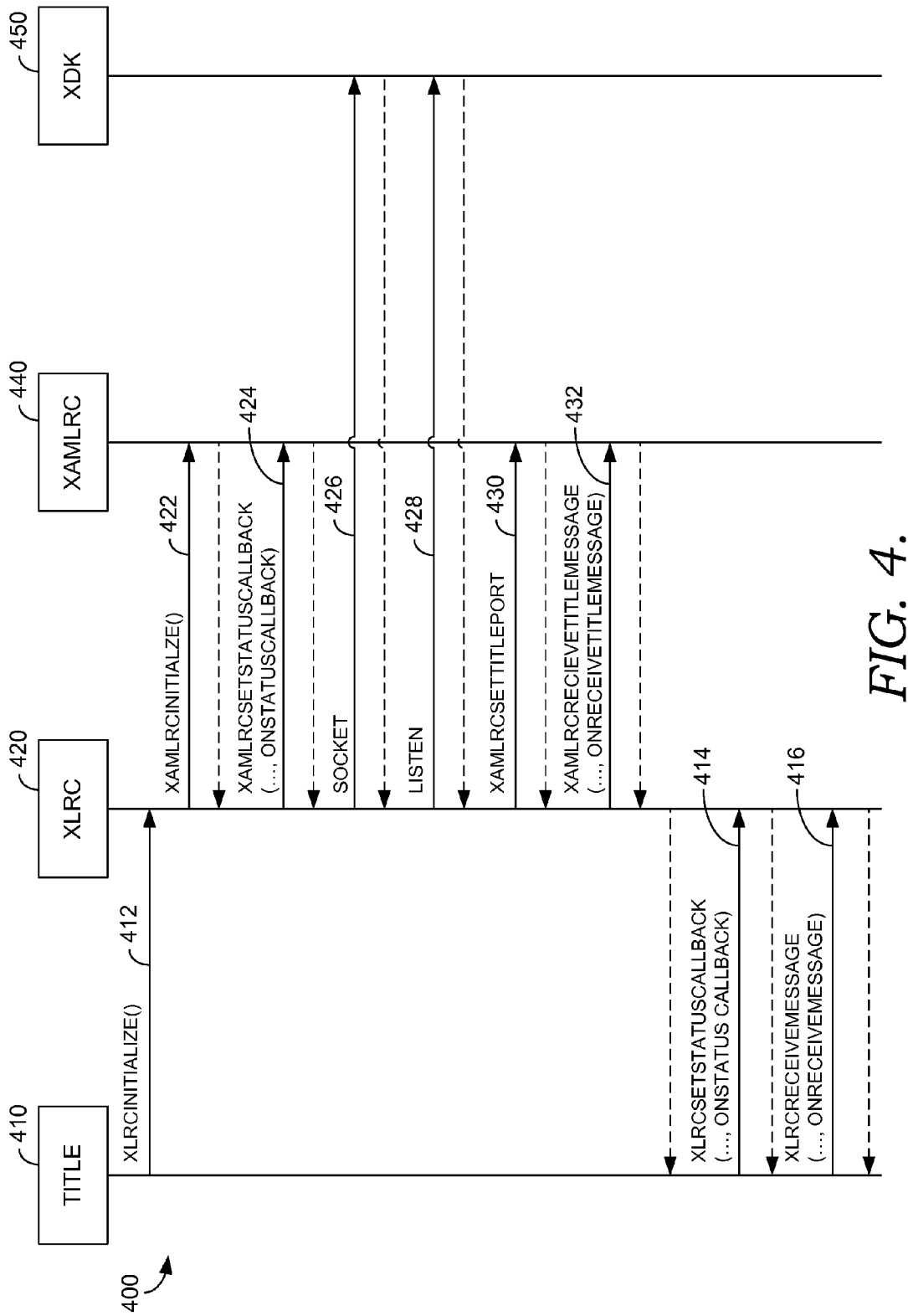
FIG. 4 is a sequence diagram depicting an exemplary initiation of a generic companion-messaging session by a title, in accordance with an embodiment of the present invention.

FIG. 4 is a sequence diagram 400 depicting an exemplary initiation of a generic companion-messaging session by a title 410. Embodiments of the invention are not limited to names used with these message types. The title 410 initializes 412

XLrc 420 by calling XLrcInitialize. XLrc 420 initializes 422 XamLrc 440 by calling XamLrcInitialize and passes 442 a status callback function to receive 424 status change notifications. XLrc 420 creates 426 a TCP socket and puts it in listening mode 428. XLrc 420 passes 430 the listening socket's port number to XamLrc 440 by calling XamLrcSetTitle-Port. This enables client devices to retrieve this information by sending a TMF command (e.g., LRC_MES-SAGE_GET_ACTIVE_TITLE_INFO). XLrc 420 also calls 432 XamLrcReceiveTitleMessage to enable receiving messages from TMF. Next, the title calls 414 XLrcSetStatusCallback passing a status callback function to receive status change notifications (client connect/disconnect, media change, etc.). Finally, the title calls 416 XLrcReceiveMessage to enable receiving messages over the local network connection and from TMF.

Figure 5:
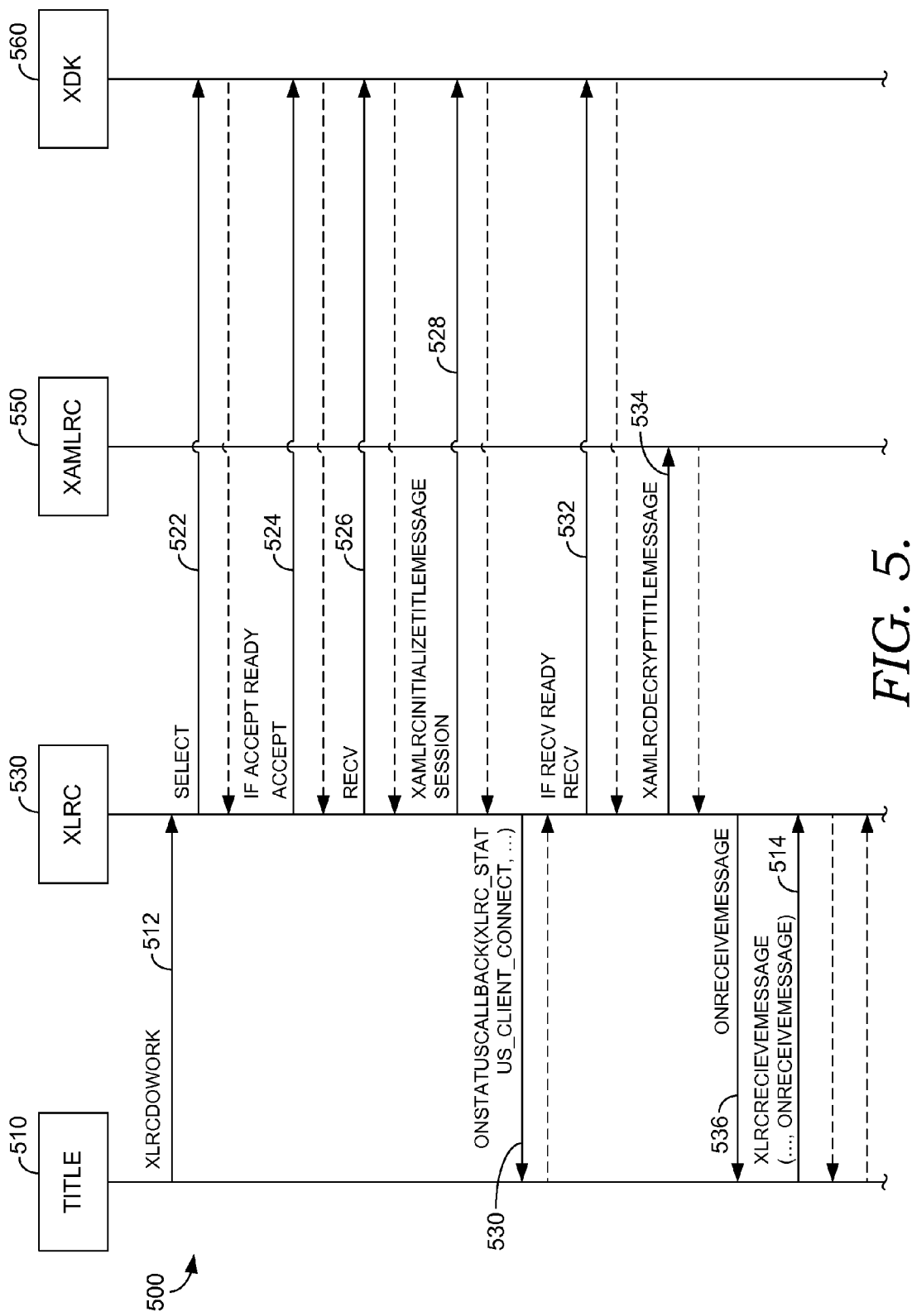
FIG. 5 is a sequence diagram depicting an exemplary run loop, in accordance with an embodiment of the present invention.

FIG. 5 is a sequence diagram 500 depicting an exemplary run loop. Title 510 calls 512 XLrcDoWork as often as possible. Typically, this will be done as part of the run (game) loop. XLrcDoWork will test the TCP listener socket to see if any device is attempting to connect. When a device is connecting 522, 524, and 526 XLrcDoWork accepts the request (subject to a maximum title message sessions in some embodiments) and then receives an incoming XLRC_MES-SAGE_CONNECT message. Though shown below as a series of sequential operations the actual flow may be asynchronous and deal with timeouts and errors. Having received the XLRC_MESSAGE_CONNECT message, a title message session is established 528 in the XamLrc 550 by calling XamLrcInitializeTitleMessageSession. If the message is invalid, then XLrc will close the socket. If the message is valid and the session is initialized, then a status callback (e.g., XLRC_STATUS_CLIENT_CONNECT) indicating 530 a new client has connected is invoked.

When a title has clients that have connected to it over the local network connection XLrcDoWork will also test these open TCP sockets to see when recv and send can be called. When a socket is ready for a recv 532 and a previous XLrcReceiveMessage call hasn't been completed, XLrcDoWork calls recv followed 534 and 536 by XamLrcDecryptTitle-Message before calling 514 the callback specified in the XLrcReceiveMesssage call. When a socket is ready for a send call and a previous XLrcSendMessage call hasn't been completed, XLrcDoWork calls 538 XamLrcEncryptTitleMessage (could be done when XLrcSendMessage was invoked) followed by send 540 before calling 542 the callback specified in the XLrcSendMessage call. As shown, whenever a title receives a message it may immediately call XLrcReceiveMessage to ensure messages continue to be processed in a timely manner.

Figure 6:
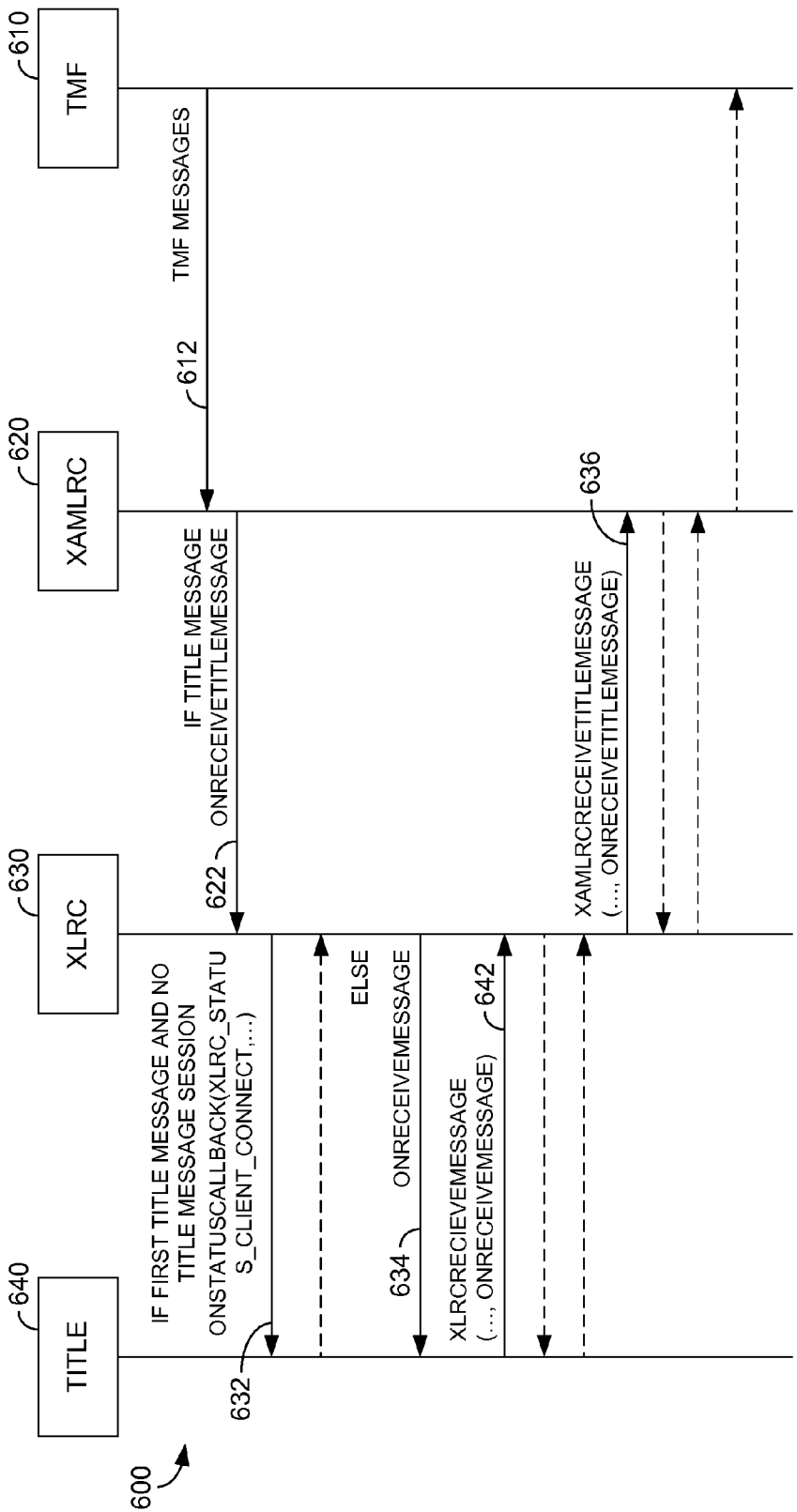
FIG. 6 is a sequence diagram depicting a title receiving messages over time, in accordance with an embodiment of the present invention.

FIG. 6 depicts a sequence diagram 600 depicting a title receiving messages over TMF service. Generic messages routed 612 through TMF 610 are delivered up through XamLrc 620. When it receives 622 a generic message and a previous XamLrcReceiveTitleMessage call hasn't been completed, XamLrc invokes 632 the callback specified in the XamLrcReceiveTitleMessage call. Messages routed through TMF are not encrypted so no additional processing is required. If the callback is invoked inside of XLrc (e.g. OnReceiveTitleMessage below), the sender of the message doesn't yet have a title message session, one is created and the status callback specified when XLrcInitialize was called is invoked with the XLRC_STATUS_CLIENT_CONNECT message. If, instead, the sender of the message already has a title message session 634, then XLrc 630 will either cache the message or if a previous XLrcReceiveMessage call hasn't been complete, XLrc 630 invokes the callback specified in the XLrcReceiveMessage call. Again, when a call to XLrcReceiveMessage is completed, the title 640 may immediately call 642 XLrcReceiveMessage to ensure messages are processed 636 via the XLrc 630 and XamLrc 630 as quickly as possible.

Figure 7:
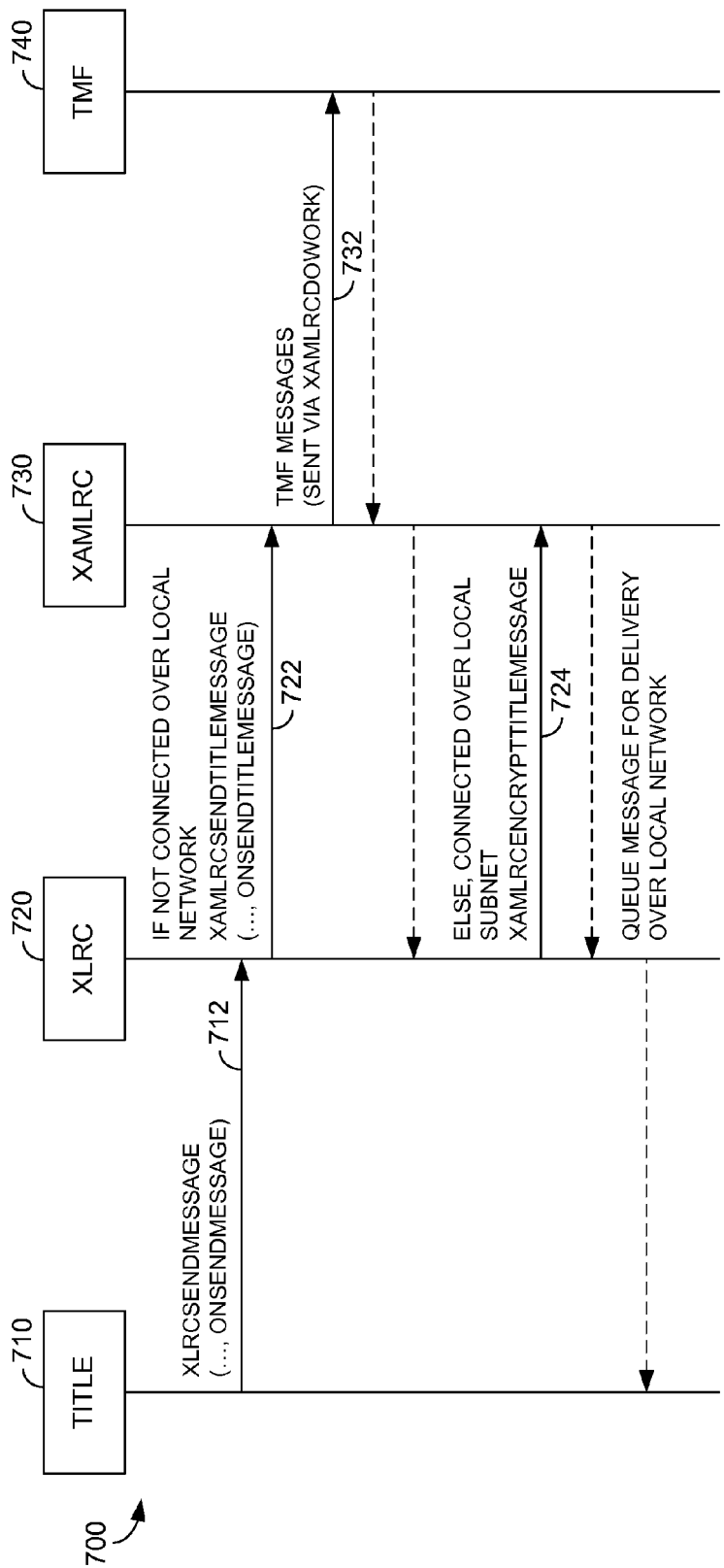
FIG. 7 is a sequence diagram depicting a sequence diagram illustrating a title sending messages to a hosted application, in accordance with an embodiment of the present invention.

FIG. 7 depicts a sequence diagram 700 illustrating a title 710 sending 712 messages to a host application. Titles send messages by calling XLrcSendMessage. If the title 710 is not connected over the local network connection to the device it is sending the message to the message will be routed 722 and 732 over TMF 740 by XLrc 720 calling XamLrcSendTitleMessage of XamLrc 730. A list of uncompleted XLrcSendMessage calls is kept, pairing them with their respective XamLrcSendTitleMessage calls, so that when the message is sent, completion can be signaled through the proper callback chain. When a message is sent and the title is connected over the local network connection to the device it is sending 722 the message to the message is queued to be sent when TCP socket is available for send. See FIG. 5 for more details.

Figure 8:
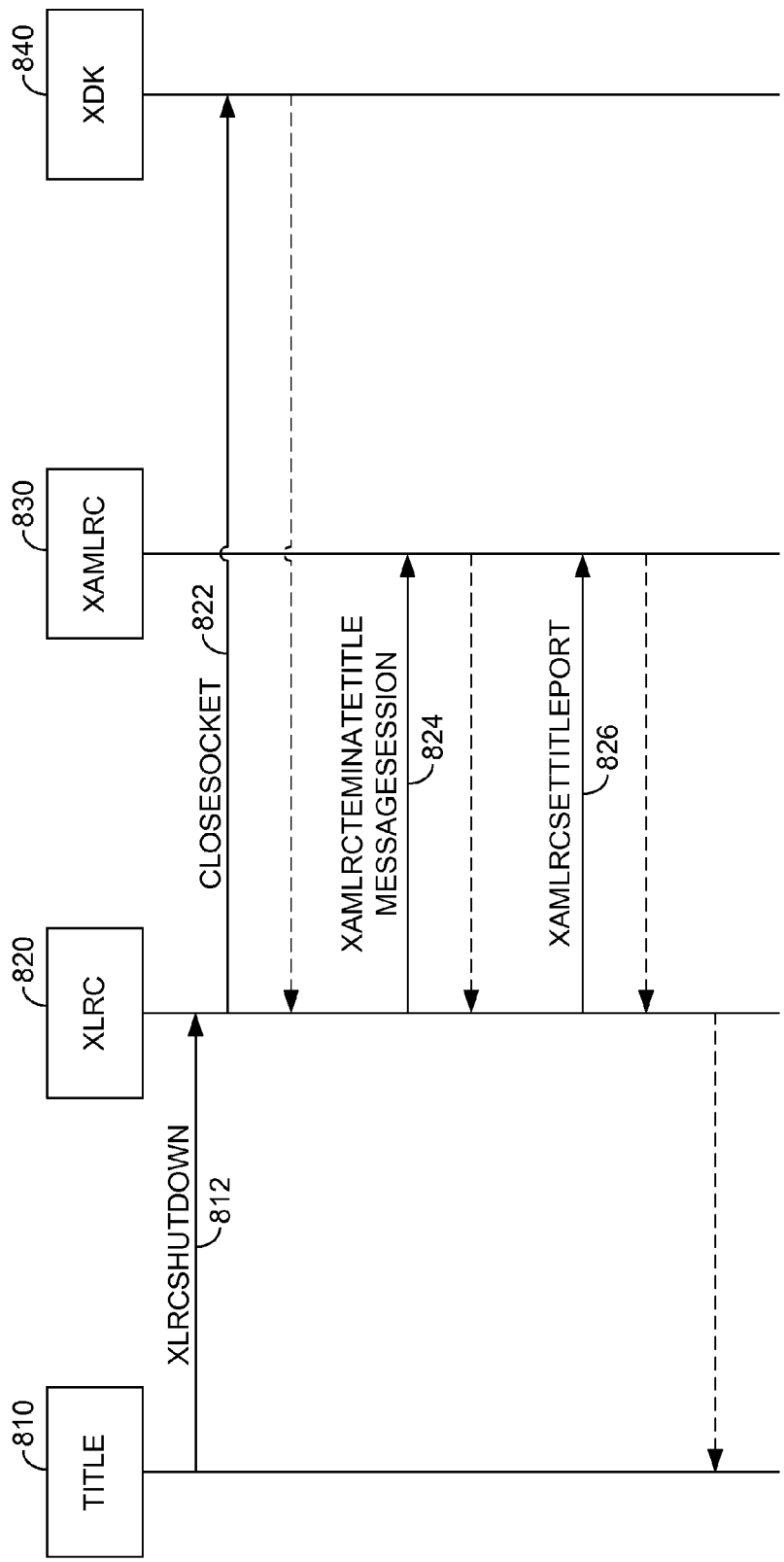
FIG. 8 is a sequence diagram depicting title termination, in accordance with an embodiment of the present invention.

FIG. 8 depicts a sequence diagram 800 illustrating title termination with title 810, XLrc 820, XamLrc 830 and XDK 840. When a title 810 is terminating it calls 812 XLrcShutdown to cleanup. XLrc 820 first closes 822 all open sockets, the TCP listener and title message session sockets. Then, it calls 824 XamLrcTerminateTitleMessageSession for each client that had established a title message session. Next, it calls 826 XamLrcSetTitlePort with a 0 for the listener port indicating that it is no longer listening.

Figure 9:
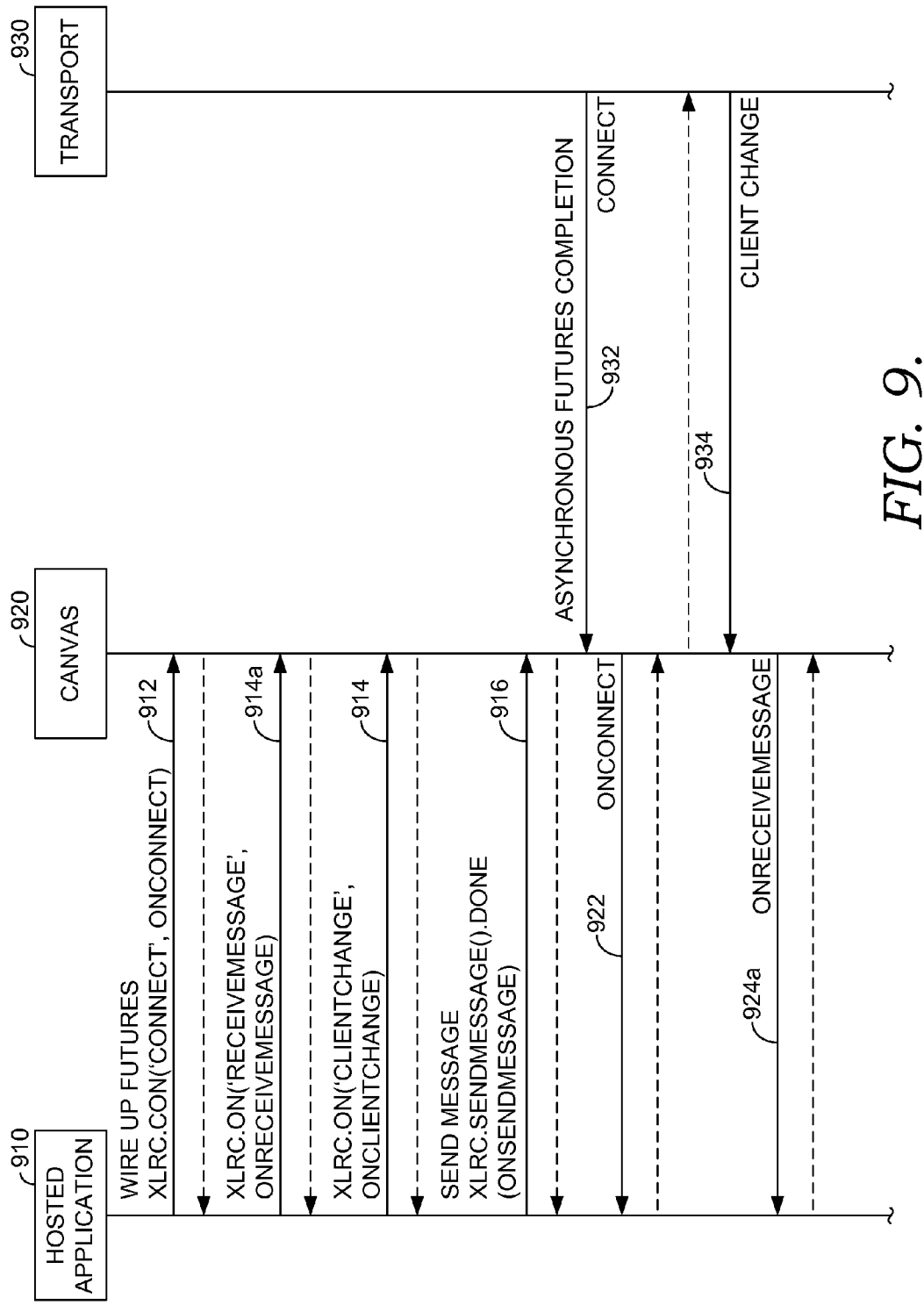
FIG. 9 is a sequence diagram depicting features wired up by a hosted application, in accordance with an embodiment of the present invention.
Figure 9:
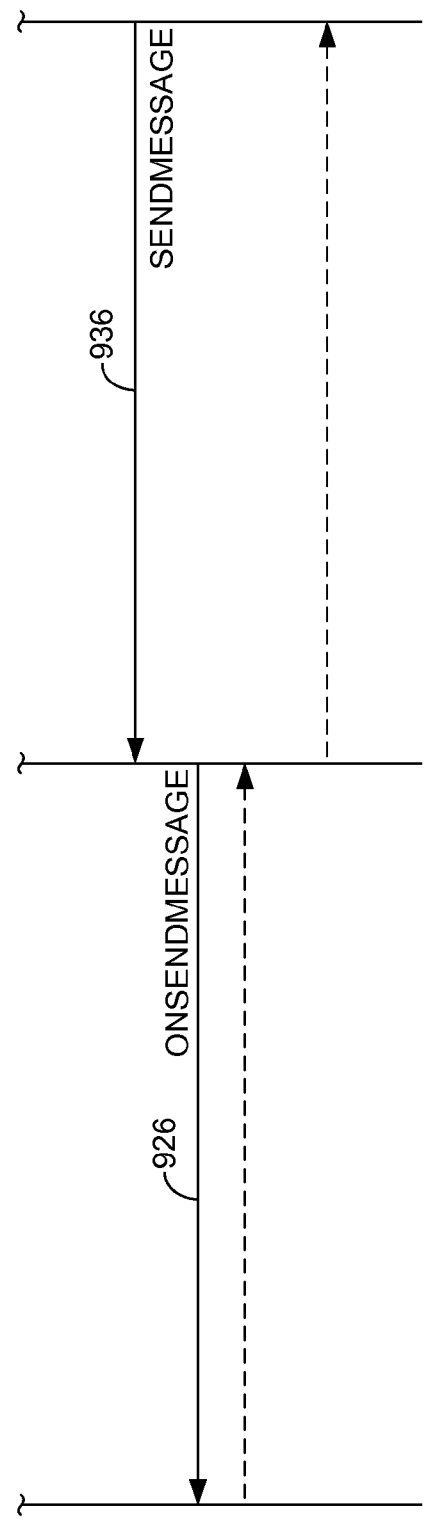

FIG. 9 depicts a sequence diagram 900 illustrating futures wired up by a hosted application 910 with canvas 920 and transport 930. When a hosted application 910 is ready, it will wire up various futures to handle asynchronous events: connect 912, 922, 932, receiveMessage 914*a*, 924*a*, and clientChange 914, 934. During normal operation an application may send the currently running title a message by calling 916, 926, 936 sendMessage. When any of the asynchronous events occur, including sendMessage completing, the corresponding done method is called, or in the case of failure the fail method is called.

Developers may wish to test the generic companion-messaging system as part of application development. A tool for testing generic companion-messaging between titles and hosted applications and vice versa is provided by embodiments of the invention. The tool allows testing of title applications and hosted applications in isolation from each other. This enables troubleshooting communications. The tool supports evaluation of sending and receiving messages on alternate device platforms.

Both the device and the console may be aware of the transport they employ for communication with one another. The transport library of the device attempts to establish a connection and therefore knows if it was successful. The console may be made aware of a connection when the device successfully connects and then sends a title message session initialization message (e.g., LRC_MESSAGE_TITLE_MESSAGE_SESSION_INIT). Regardless, of the transport, the device always sends this message to initialize the title message session. Additionally, both the title and the hosted companion application can determine each device's transport when receiving information about each client. An event will be fired whenever a companion client connects or disconnects from a session. An enumeration of all clients currently in the session can be obtained, along with whether the client is connected over local network connection or over the cloud.

HTML5 hosted applications can be developed using a JavaScript library that is available as part of a hosted companion application SDK. The library provides APIs for getting notification about connection state changes, sending and receiving messages, and access to various device sensors. The JavaScript library exposes methods for both receiving title messages from the console as well as sending title messages to the console. An event may be fired whenever a companion client connects or disconnects from a session. This can be used to track the number of currently connected devices in a session. The JavaScript library exposes methods for the hosted companion application to connect or disconnect from the title message session.

The companion experience includes a plurality of APIs that expose raw touch as well as interpreted gestures. The APIs or events may be stored in the JavaScript library. Example touch/gestures supported by embodiments of the invention include Tap, Double Tap, Hold, Drag Start, Drag Delta, Drag Complete, Pinch Start, Pinch Delta, Pinch Completed and Flick. With the tap, a user briefly touches a single point on the screen. With the double tap, the user taps the screen twice in quick succession. This may be preceded by a tap gesture. If the time between taps is too great to be considered a double tap, two tap gestures will be generated instead.

With the hold, the user touched a single point on the screen for approximately a threshold period of time, such as one second. This is a single event, and not continuously generated while the user is holding the touchpoint. With the drag started event, the user touches the screen and initiates a drag gesture. The drag delta is an event that fires at regular intervals while the user is performing a drag gesture. The drag completed is activated when the user completes a drag operation.

For the pinch started, the user touched the screen and initiates a pinch gesture. For the pinch delta, an event that fires at regular intervals while the user is performing a pinch gesture. The pinch completed event is activated when a pinch is completed. The flick event is activated when the user performs a touch combined with a quick swipe of the screen.

Methods and events are provided for gathering data from the following sensors (depending on availability in the underlying hardware): accelerometer, gyroscope, GPS/Location, compass, proximity sensor, light sensor, vibration, and Hard/Soft Buttons.

Embodiments of the present invention provide companion experiences that integrate with game console titles across multiple companion platform platforms, including IOS, WINDOWS PHONE, WINDOWS 8, and ANDROID. HTML5 hosted companion applications are applications running within the game console's companion application. With a combination of an XDK title library on the console and JavaScript APIs on the companion platform, a rich set of applications can be built to extend the functional/interactivity of console titles.

An example of a hosted companion application that would be enabled with the game console companion platform is a Poker game. Imagine a scenario where you are playing Poker with a group of friends that are over at your house. The Poker title on the console can be extended to display an individual's poker hand on their companion platform (and there can be up to 4 simultaneously connected to the console). The hosted companion application can use the JavaScript APIs to implement features like "flicking" chips from the companion platform to the console, and for sending information to the console via the messaging APIs to have those chips appear on the shared TV screen and have the corresponding bet placed.

Another example of a hosted companion application is an application (or possibly set of applications) to be used in conjunction with a sports network title on the game console. When connected to the console, the application may allow for things like queuing up a set of highlights to watch or selecting favorite teams/sports to track. Even when not connected to the console, the application may allow the user to view their fantasy football stats, make player selections, trades, etc. by communicating directly with a set of cloud-based services that don't require communication directly with the console.

Figure 10:
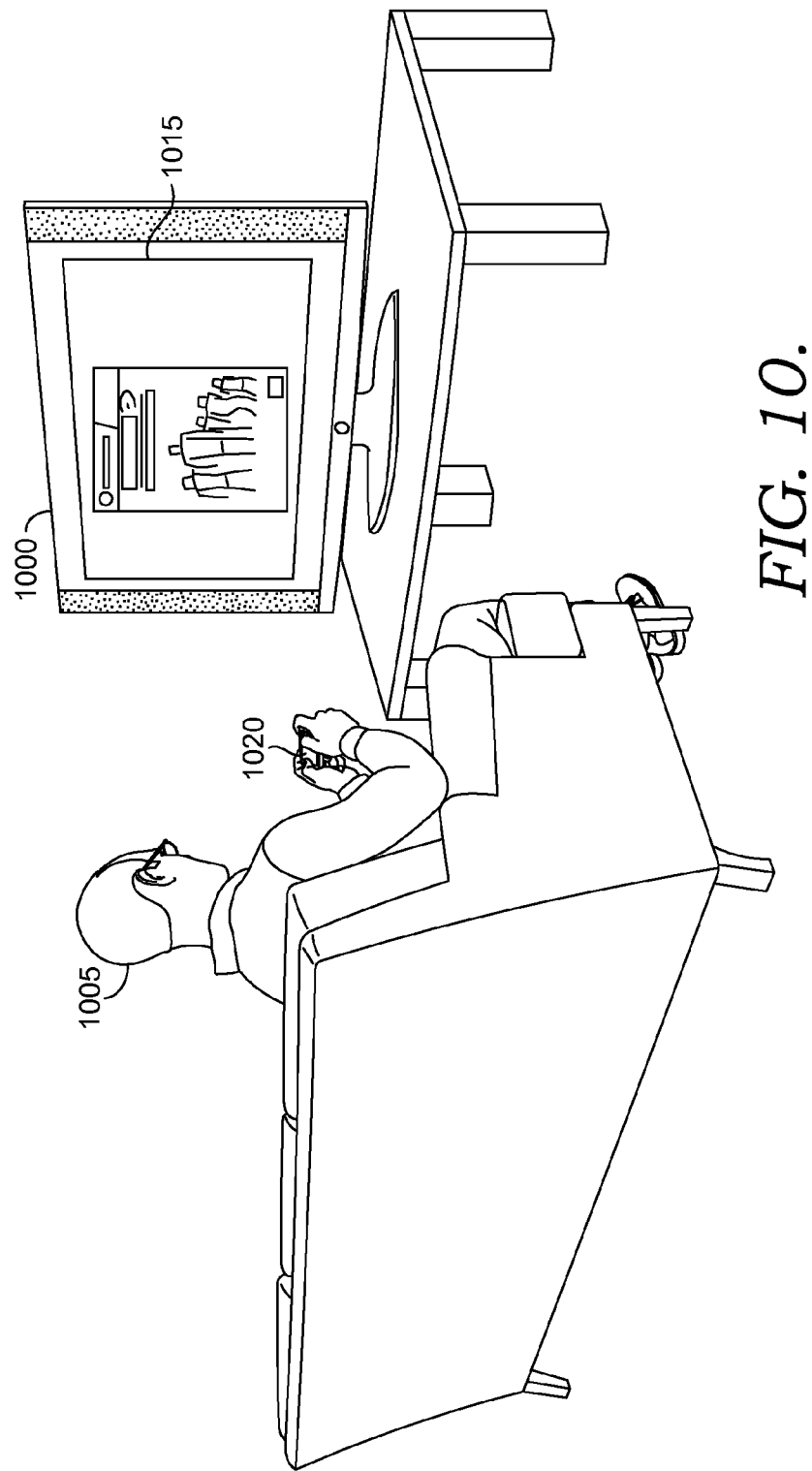
FIG. 10 is a diagram showing a user interacting with a game console interface using a device, in accordance with an embodiment of the present invention.
Figure 12:
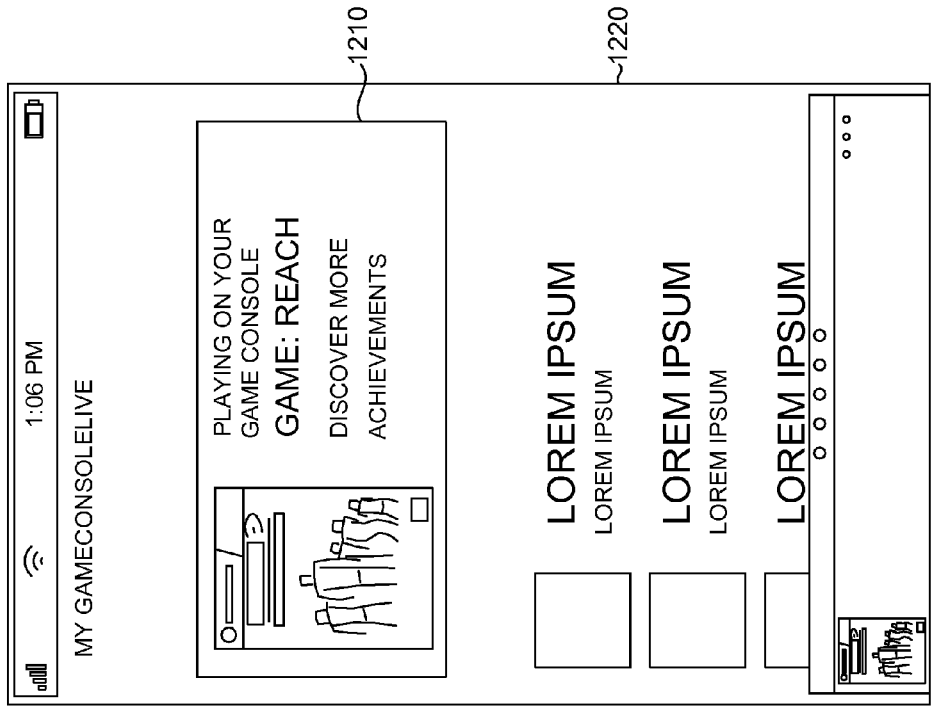
FIG. 12 is a diagram of an interface displayed on a companion device showing a detailed view of what is currently playing on a game console, in accordance with an embodiment of the present invention.
Figure 11:
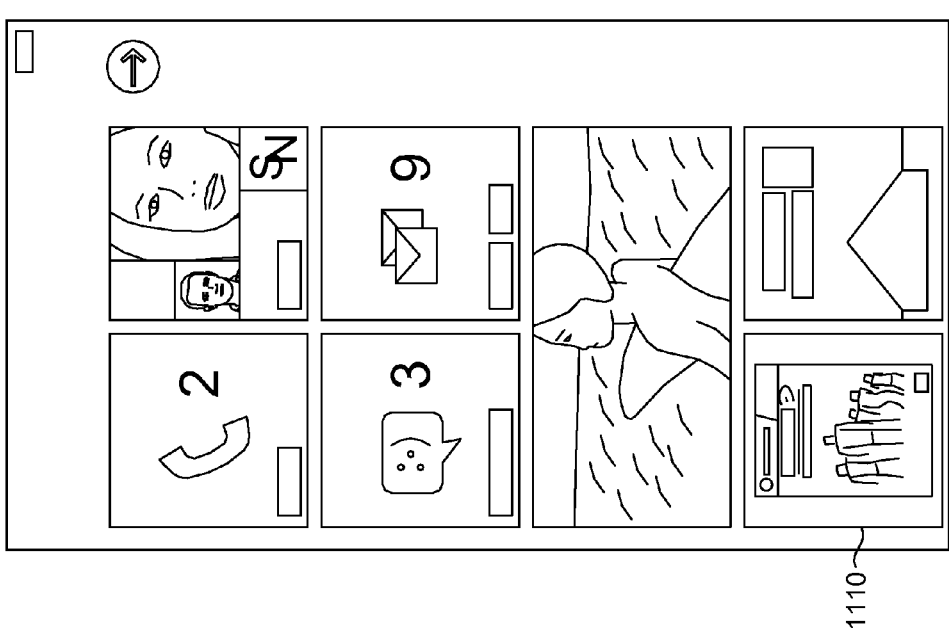
FIG. 11 is a diagram of an interface displayed on a companion device showing what is currently playing on a game console, in accordance with an embodiment of the present invention.

FIGS. 10-12 depict a companion experience that informs the user about details of a game running on the user's console. FIG. 10 shows a user 1005 sitting on their couch interacting with an interface 1015 displayed on display device 1000. In addition to a game controller (not shown) for controlling the game play, the user 1005 has a device 1020 (e.g., smartphone, tablet). As such, instead of having to exit the game play and navigating to additional menu to find out related information for the game, the user 1005 may simply turn to the device 1020 and find out this information. As can be seen, the interface 1015 provides current game play of the video game while additional options that are compatible with the device 1020 are available via the device 1020. For example, FIGS. 11 and 12 depict a companion experience that informs the user of additional information of the title currently running on the game console. In FIG. 11, a "live tile" 1110 displayed on the device 1120 (e.g., smartphone) shows what title is currently playing on the game console. Clicking on the live tile on either the start screen or the games hub will launch the console companion and display the details page shown in FIG. 12. The user can then device 1220 to find additional related information for the game.

Turning now to FIG. 13, a flow diagram is provided that illustrates a method 1300 for communicating via a generic companion-messaging session. At block 1310, an initialization message is sent to a base platform for a generic companion-messaging session between a companion platform application and a base platform application. The generic companion-messaging session, automatically pairs the companion platform application and the base platform application. At block 1320, a connection to an encrypted communication channel for the generic companion-messaging session with the base platform is made. The encrypted communication channel supports bidirectional communication over a plurality of connections. At block 1330, a connection is determined, from the plurality of connections, for routing a message. The message is routed via a direct connection when a direct connection with the base platform is determined and the message is routed via an indirect connection when an indirect connection with the base platform is determined. The direct connection is a local network connection with the base platform and the indirect connection is an Internet-service connection. At block 1340, the message is communicated such that the message is routed based on the connection with the base platform.

Turning now to FIG. 14, a flow diagram is provided that illustrates a method 1400 for communicating via a generic companion-messaging session. Initially at block 1410, an initialization message is received from a companion platform for a generic companion-messaging session between a companion platform application and a base platform application. The generic companion-messaging session automatically pairs the companion platform application and the base platform application based on a generic companion-messaging abstraction layer that facilitates platform-independent communication between the companion platform application and the base platform application. At block 1420, a connection to an encrypted communication channel for the generic companion-messaging session with the companion platform is made. The encrypted communication channel supports bidirectional communication over a plurality of connections. A connection, from the plurality of connections, is determined for routing a message, as show at block 1430. The message is routed via a direct connection when a direct connection with the companion platform is determined and the message is routed via an indirect connection when an indirect connection with the companion platform is determined. The direct connection is a local network connection with the base platform and the indirect connection is an Internet-service connection. At block 1440, the message is communicated such that the message is routed based on the connection with the base platform.

Turning now to FIG. 15, a flow diagram is provided that illustrates a method for communicating via a generic companion-messaging session. At block 1510, an initializing message for the generic companion-messaging session is sent from a base platform to a companion platform. The generic companion-messaging session, automatically pairs a companion platform application on the companion platform with a base platform application on the base platform based on a generic companion-messaging abstraction layer that facilitates platform-independent communication between the companion platform application and the base platform application. At block 1520, an encryption key is received at the base platform for an encrypted communication channel for the generic companion-messaging session with the companion platform associated with the encryption key. The encrypted communication channel supports bidirectional communication over a plurality of connections. Prior to routing a base platform message, a connection establishment notification is received at the base platform from the companion platform for the generic companion-messaging session, as shown at block 1530. At block 1540, the base platform message is communicated such that the base platform message is routed based on the connection with the companion platform.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media storing computer-useable instructions that, when used by one or more computing devices, cause the one or more computing devices to perform a method for communicating via a generic companion-messaging session, the method comprising:

sending an initialization message to a base platform for the generic companion-messaging session between a companion platform application and a base platform application, wherein, the generic companion-messaging session automatically pairs the companion platform application and the base platform application;

connecting to an encrypted communication channel for the generic companion-messaging session with the base platform, wherein the encrypted communication channel supports bidirectional communication over a plurality of connections;

determining a connection, from the plurality of connections for routing a message, to cause different types of generic companion-messaging functionality, of the companion platform application and the base platform application using the encrypted communication channel, to be available based on the connection that is determined, wherein the message is routed via a direct connection when the direct connection with the base platform is determined and the message is routed via an indirect connection when the indirect connection with the base platform is determined, and wherein the direct connection is a local network connection with the base platform and the indirect connection is an Internet-service connection; and communicating the message such that the message is routed based on the connection with the base platform.

2. The media of claim 1, wherein, the generic companion-messaging session automatically pairs the companion platform application and the base platform application based on a generic companion-messaging abstraction layer that facilitates platform-independent communication between the companion platform application and the base platform application.

3. The media of claim 2, wherein the generic companion-messaging abstraction layer comprises a companion platform-side API (Application Program Interface) for the companion platform application that corresponds to a base platform-side API for the base platform application.

4. The media of claim 3, wherein the companion platform-side API provides abstraction for the generic companion-messaging session to support dynamic scriptable rendering on the companion platform application.

5. The media of claim 1, wherein connecting to the encrypted communication channel further comprises receiving an encryption key associated with the base platform.

6. The media of claim 1, further comprising:
upon failure of the direct connection, automatically communicating the message such that the message is routed via the indirect connection.

7. The media of claim 1, further comprising:
prior to communicating the message such that the message is routed, sending to the base platform a connection establishment notification of the generic companion-messaging session.

8. One or more computer storage media storing computer-useable instructions that, when used by one or more computing devices, cause the one or more computing devices to perform a method for communicating via a generic companion-messaging session, the method comprising:

receiving an initialization message from a companion platform for the generic companion-messaging session between a companion platform application and a base platform application, wherein the generic companion-messaging session automatically pairs the companion platform application and the base platform application based on a generic companion-messaging abstraction layer that facilitates platform-independent communication between the companion platform application and the base platform application;

connecting to an encrypted communication channel for the generic companion-messaging session with the companion platform, wherein the encrypted communication channel supports bidirectional communication over a plurality of connections;

determining a connection from the plurality of connections for routing a message, to cause different types of generic companion-messaging functionality, of the companion platform application and the base platform application using the encrypted communication channel, to be available based on the connection that is determined, wherein the message is routed via a direct connection when the direct connection with the companion platform is determined and the message is routed via an indirect connection when the indirect connection with the companion platform is determined, and wherein the direct connection is a local network connection and the indirect connection is an Internet-service connection; and communicating the message such that the message is routed based on the connection with a base platform.

9. The media of claim 8, wherein receiving the initialization message is based at least in part on an association with a user account on the companion platform.

10. The media of claim 8, wherein receiving the initialization message is based at least in part on an association with a service discovery protocol.

11. The media of claim 8, further comprising:
simultaneously routing a first message via the direct connection to a first companion platform when the direct connection with the first companion platform is determined; and
routing a second message via the indirect connection to a second companion platform when the indirect connection with the second companion platform is determined.

12. The media of claim 8, wherein communicating the message to the companion platform provides companion functionality of the base platform application on a first device in association with the companion platform application on a second device.

13. The media of claim 8, further comprising:
broadcasting to one or more companion platform applications a broadcast message based on the connection associated with the companion platform running the companion platform application.

14. A method for communicating via a generic companion-messaging session, the method comprising:
sending an initializing message for the generic companion-messaging session from a base platform to a companion platform, wherein the generic companion-messaging session automatically pairs a companion platform application on the companion platform with a base platform application on the base platform based on a generic companion-messaging abstraction layer that facilitates platform-independent communication between the companion platform application and the base platform application;
receiving an encryption key at the base platform for an encrypted communication channel for the generic companion-messaging session with the companion platform associated with the encryption key, wherein the encrypted communication channel supports bidirectional communication over a plurality of connections;
prior to routing a base platform message, receiving at the base platform from the companion platform a connection establishment notification for the generic companion-messaging session;
automatically communicating the base platform message such that the base platform message is routed based on a connection with the companion platform, wherein different types of generic companion-messaging functionality, of the companion platform application and the base platform application using the encrypted communication channel, are available based on the connection.

15. The method of claim 14, wherein the generic companion-messaging session abstraction layer functions to supports transparency between base platform application and the companion platform application such that the base platform application and the companion platform application do not communicate with one or more platform-specific interfaces.

16. The method of claim 14 further comprising:
determining the connection from the plurality of connections for routing a companion platform message, wherein the companion platform message is routed via the direct connection when the direct connection with the base platform is determined and the companion platform message is routed via the indirect connection when the indirect connection with the base platform is determined, and wherein the direct connection is the local network connection with the base platform and the indirect connection is the Internet-service connection; and
routing the companion platform message based on the connection with the base platform.

17. The method of claim 16, wherein the companion platform message is routed to the base platform such that companion functionality of the companion platform application on a first device is provided to the base platform application on a second device.

18. The method of claim 17, wherein the companion functionality comprises a secondary display screen at the companion platform associated with a primary display screen at the base platform.

19. The method of claim 17, wherein the companion functionality comprises navigation of the base platform application via the companion platform application.

20. The method of claim 17, wherein the companion platform is a touch-screen device and the base platform is a game console.

* * * * *